United States Patent
Fukawatase

(10) Patent No.: US 8,511,710 B2
(45) Date of Patent: Aug. 20, 2013

(54) AIRBAG DEVICE

(75) Inventor: Osamu Fukawatase, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/578,181

(22) PCT Filed: Feb. 15, 2010

(86) PCT No.: PCT/JP2010/052173
§ 371 (c)(1),
(2), (4) Date: Aug. 9, 2012

(87) PCT Pub. No.: WO2011/099158
PCT Pub. Date: Aug. 18, 2011

(65) Prior Publication Data
US 2013/0127142 A1 May 23, 2013

(51) Int. Cl.
*B60R 21/16* (2006.01)

(52) U.S. Cl.
USPC .......................................... 280/743.1

(58) Field of Classification Search
USPC ................... 280/743.1, 743.2, 731
See application file for complete search history.

(56) References Cited

U.S. PATENT DOCUMENTS

| | | | | |
|---|---|---|---|---|
| 3,784,225 | A | * | 1/1974 | Fleck et al. ............. 280/729 |
| 5,427,410 | A | * | 6/1995 | Shiota et al. ............. 280/743.1 |
| 5,599,041 | A | | 2/1997 | Turnbull et al. |
| 2010/0032931 | A1 | * | 2/2010 | Kumagai et al. ............. 280/742 |

FOREIGN PATENT DOCUMENTS

| | | |
|---|---|---|
| JP | A-10-244902 | 9/1998 |
| JP | A-2006-88856 | 4/2006 |
| JP | A-2006-88998 | 4/2006 |
| JP | A-2007-106376 | 4/2007 |
| JP | A-2007-145098 | 6/2007 |
| JP | A-2007-161201 | 6/2007 |
| JP | A-2009-40220 | 2/2009 |
| JP | A-2009-190573 | 8/2009 |
| WO | WO 2007/045952 A1 | 4/2007 |

* cited by examiner

*Primary Examiner* — Faye M. Fleming
(74) *Attorney, Agent, or Firm* — Oliff & Berridge, PLC

(57) ABSTRACT

An airbag device capable of reducing the volume of an airbag while still securing occupant restraining capability. The occupant seat airbag device is disposed inside a vehicle front-rear direction curved section of an instrument panel facing both towards the vehicle top-bottom direction top side and vehicle front-rear direction rear side. The airbag is configured including a pair of outer deployment sections that receive gas supplied from an inflator and inflate and deploy separately from each other in the vehicle width direction, and an inner deployment section formed by a connecting a cloth around substantially the entire periphery of the outer edges of the pair of outer deployment sections. An occupant side deployment section of the inner deployment section does not receive gas supplied from the inflator and deploys as the pair of outer deployment sections deploy.

5 Claims, 11 Drawing Sheets

AIRBAG DEVICE

TECHNICAL FIELD

The present invention relates to an airbag device that inflates and deploys at the vehicle front of an occupant in order to restrain movement of the occupant forwards.

BACKGROUND ART

Airbag devices are known with gas volume reduced by supplying gas to a portion of an occupant seat airbag to cause the airbag to deploy (see, for example, Japanese Patent Application Laid-Open (JP-A) No. 2007-106376, JP-A No. 2007-161201 and JP-A No. 2007-145098). Airbag devices are also known that deploy so as to form an indented portion between rear ends of a left and right pair of bags for restraining the head of an occupant (see for example JP-A No. 2006-88856 and 2006-88998).

DISCLOSURE OF INVENTION

Technical Problem

However, during occupant restraint, an occupant seat airbag device mainly suppresses movement towards the vehicle front by frictional force with a windshield glass and an instrument panel. There is therefore room for improvement in securing occupant restraining capability, due to the reduction that occurs in contact surface area of the airbag with the windshield glass when, for example, an airbag is disposed at the rear portion of an instrument panel.

The present invention is directed towards an airbag device capable of reducing the volume of an airbag while still securing occupant restraining capability.

Solution to Problem

An airbag device according to a first aspect of the present invention includes: a gas generation device that is disposed inside a portion of an instrument panel facing a vehicle top-bottom direction top side and a vehicle front-rear direction rear side; a pair of outer deployment sections that receive gas supplied from the gas generation device and inflate and deploy separately from each other in a vehicle width direction; and an inner deployment section that connects the pair of outer deployment sections at least at the vehicle front-rear direction rear side, the vehicle top-bottom direction top side and a vehicle top-bottom direction bottom side, the inner deployment section deploying as the pair of outer deployment sections are deployed.

According to the above aspect, the pair of outer deployment sections inflate and deploy with gas supplied from the inflator, and, accompanying this inflation and deployment, the inner deployment section also inflates and deploys. In the present airbag device, gas supply is concentrated on the pair of outer deployment sections deployed between the instrument panel and the windshield glass, namely on the main contact portions with the instrument panel and the windshield glass. The airbag contact pressure with the instrument panel and the windshield glass is accordingly raised, thereby achieving efficient supporting reaction force during occupant restraint by the airbag through friction at the contact locations. Gas from the gas generation device is also supplied to the outer deployment sections and so the volume of the portions of the airbag inflated by gas can be reduced in volume.

The airbag device of the above aspect can accordingly reduce the volume of the airbag while still securing occupant restraining capability.

The above aspect may be configured such that the inner deployment section is configured by connecting peripheral edges of the pair of outer deployment sections with a single cloth so as to deploy to form a closed space between the pair of outer deployment sections.

According to the above aspect, the inner deployment section is formed by a closed space between the pair of outer deployment sections and so the occupant restraining capability is raised.

The above aspect may be configured such that the airbag device further includes a partitioning cloth that partitions the closed space into a first space at a vehicle front-rear direction front side and a second space at the vehicle front-rear direction rear side, the partitioning cloth being configured such that gas from the gas generation device is supplied to the first space According to the above aspect, the contact pressure at the first space between the instrument panel and the windshield glass is raised, and the reaction force when the occupant is being restrained by the airbag is even more efficiently supported.

The above aspect may be configured such that the partitioning cloth is deployed in an inclined shape such that a vehicle top-bottom direction top portion of the first space is positioned further toward the vehicle front-rear direction rear side than a vehicle top-bottom direction bottom portion of the first space.

According to the above aspect, in the first space relatively positioned towards the front side, the top portion thereof projects out further toward the rear side than the bottom portion. Hence even when an occupant moves forwards due to inertia under rapid deceleration, the movement of the occupant can be restrained appropriately.

The above aspects may be configured such that the airbag device further includes a lower side deployment section that passes through the inner deployment section and is connected to the partitioning cloth, the lower side deployment section receiving supplied gas so as to inflate and deploy between knees of an occupant and the instrument panel; and the partitioning cloth is formed with a gas supply hole through which gas from the inflator gas generation device is caused to flow through the first space into the lower side deployment section.

According to the above aspect, gas is supplied into the lower side deployment section through the gas supply hole in the partitioning cloth. Gas can be supplied to the lower side deployment section a short time after actuating the gas generation device due to the airbag deploying above the instrument panel having a reduced volume, as described above. The knee restraining capability of the lower side deployment section is thereby raised.

The above aspects may be configured such that the pair of outer deployment sections includes: a first tube that is inflated and deployed so as to be disposed lengthwise along a top edge of each of the outer deployment sections; a second tube that is inflated and deployed so as to be disposed lengthwise along a bottom edge of each of the outer deployment sections; a third tube that is separated from the first tube and the second tube, and is inflated and deployed between the first tube and the second tube; a header portion that is inflated and deployed so as to be in communication with vehicle front-rear direction front end portions of the first, second, and third tubes and to guide the gas from the gas generation device to the first, second, and third tubes; an occupant side tube that extends along a vehicle top-bottom direction, and is inflated and deployed so as to be in communication with vehicle front-rear direction rear end portions of the first, second, and third tubes; and a cover section that closes off a portion surrounded by the first tube, the third tube, the header portion and the occupant side tube and that closes off a portion surrounded by the third tube, the second tube, the header portion and the occupant side tube.

According to the above aspect, portions not supplied with gas are formed between the first tube and the third tube and between the second tube and the third tube of the pair of outer deployment sections, therefore the volume of the portions of the airbag inflated by gas can be reduced in volume even further.

The above aspect may be configured such that, as seen from a side, the third tube is inflated and deployed so as to be lengthwise along a movement direction of a head of an occupant restrained in a vehicle seat by a seatbelt device during rapid vehicle deceleration.

According to the above aspect, the head of the occupant restrained by the seatbelt device proceeds forwards and downwards with respect to the airbag. This progression direction (the movement path) is substantially aligned with the length direction of the third tube, as seen from a side, and so good support load (reaction force) can be generated as the head of the occupant is being restrained.

The above aspects may be configured so that the inner deployment section deploys such that a width direction central portion of the inner deployment section has an indented shape with respect to outer deployment section sides of the inner deployment section at least at the vehicle front-rear direction rear side.

According to the above aspect, (the head of) the occupant enters into the indented portion of the inner deployment section and is restrained thereby. Therefore the shoulder regions of the occupant can be firmly restrained while still suppressing restraining force to the head of the occupant.

Advantageous Effects of Invention

As explained above, the airbag device according to the present invention exhibits the advantageous effect of being able to reduce the volume of the airbag while still securing occupant restraining capability.

BEST MODE FOR CARRYING OUT THE INVENTION

Explanation follows regarding an occupant seat airbag device 10 serving as an airbag device according to a first exemplary embodiment of the present invention, with reference to FIG. 1 to FIG. 4. The arrow FR, arrow UP and arrow W in each of the drawings respectively indicate, as appropriate, the front direction (progression direction), top direction, and vehicle width direction of the vehicle V to which the occupant seat airbag device 10 has been applied. In the following explanation, when explaining the shape of an airbag 20 (the configuration portions thereof) then unless stated otherwise this refers its shape in an inflated and deployed state.

Figure 3:
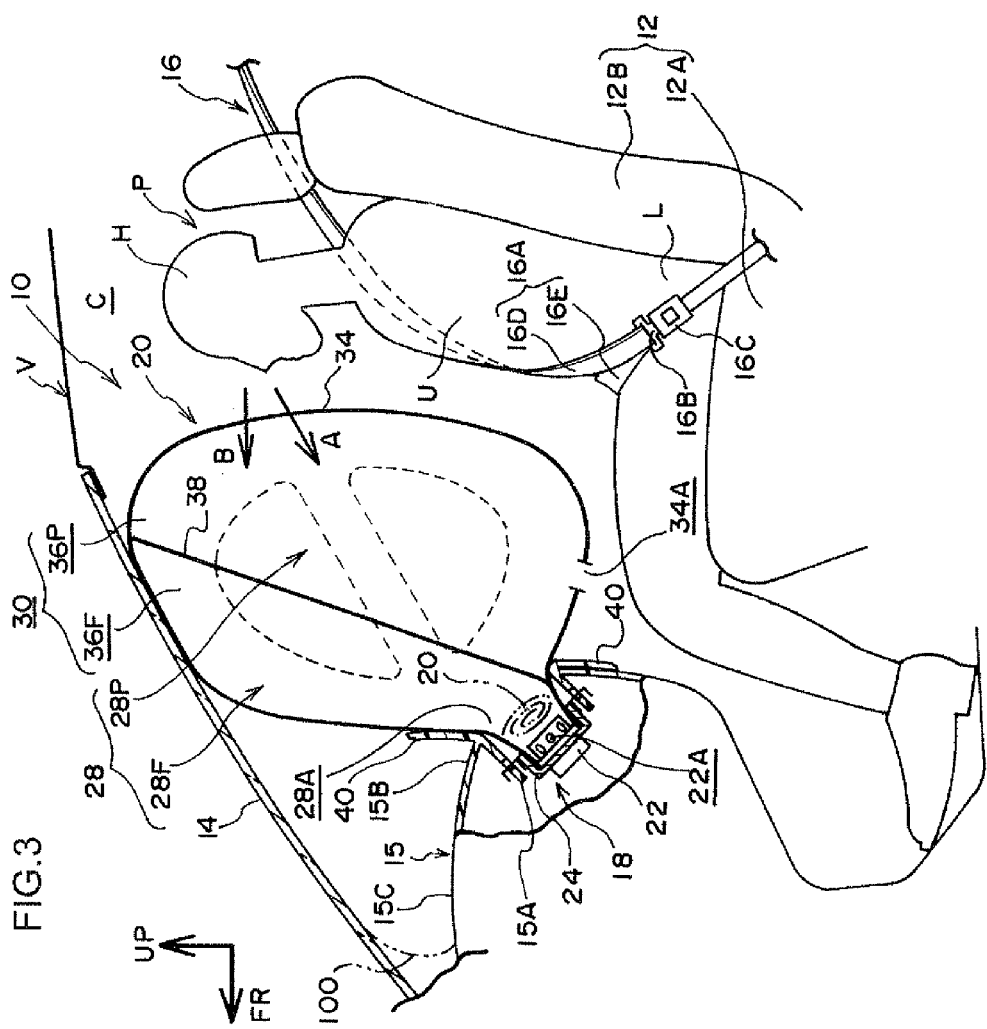
FIG. 3 is a cross-section view from the side schematically illustrating a deployed state of an airbag configuring an occupant seat airbag device according to the first exemplary embodiment of the present invention.

FIG. 3 illustrates a schematic cross-section view from the side of a front section of the interior of a vehicle compartment C of a vehicle V with the occupant seat airbag device 10 in an actuated state. As shown in FIG. 3, an occupant seat 12 serving as a vehicle seat is disposed in the interior front section of the vehicle compartment C. The occupant seat 12 includes a seat cushion 12A for an occupant P to sit on facing towards the vehicle front, and a seat back 12B for supporting the occupant P seated on the seat cushion 12A from the vehicle rear.

A windshield glass 14 defining the vehicle front end of the vehicle compartment C is disposed to the vehicle front of the occupant seat 12. An instrument panel 15 is provided to the vehicle bottom of the windshield glass 14. The instrument panel 15 projects out to the occupant seat 12 side, such that the legs of the occupant P seated in the occupant seat 12 fit under the instrument panel 15.

A seatbelt device 16 is provided to the vehicle V to restrain the occupant P seated in the occupant seat 12 from moving towards the vehicle front. The seatbelt device 16 is configured to fit over the occupant P, by an intermediate portion of webbing 16A being latched in a buckle 16C using a tongue plate 16B, with one end of the webbing 16A wound on a retractor, not shown in the drawings, so as to be capable of being pulled out therefrom, and with the other end thereof fixed by an anchor. More specifically, shoulder webbing 16D of the webbing 16A is fitted diagonally over the upper body U of the occupant P from one shoulder of the occupant P across to the buckle 16C, and lap webbing 16E is fitted across the lap region L of the occupant P from the buckle 16C across to the anchor. Accordingly, in this exemplary embodiment the seatbelt device 16 is what is referred to as a 3-point seatbelt device.

The occupant seat airbag device 10 is equipped with an airbag module 18 installed inside the instrument panel 15. The airbag module 18 is configured with main portions of the airbag 20 for restraining the upper body U of the occupant P from the vehicle front, an inflator 22 serving as a gas generation device for supplying gas into the airbag 20, and an airbag case 24 that holds (partly accommodates) the airbag 20 and the inflator 22. The airbag case 24 of the airbag module 18 is retained by an attachment portion 15A provided to the instrument panel 15.

In this exemplary embodiment the airbag module 18 is disposed in an orientation inclined to the horizontal direction, at a curved section 15B that faces towards the vehicle top and rear of a vehicle front-rear direction rear portion (in the vicinity of the rear end) of the instrument panel 15. Namely, the occupant seat airbag device 10 configures a mid-mounted type airbag device in which the airbag module 18 is disposed further toward the vehicle rear than in what is referred to as a top-mounted type airbag device, where the airbag module 18 is disposed at a substantially flat top face 15C of the vehicle front portion of the instrument panel 15.

More specifically, the airbag case 24 is retained by the attachment portion 15A in an orientation in which an opening portion of the airbag case 24 faces towards the vehicle rear and top. The airbag case 24 holds (partly accommodates) the airbag 20 in a folded state like that illustrated by the double dot intermittent lines in FIG. 3. The airbag 20 is maintained in the folded state such as by being wrapped in a protective sheet, not shown in the drawings. The inflator 22 is retained fixed to the airbag case 24 in a state in which a portion of the inflator 22 including a gas ejection outlet 22A is inserted inside the airbag 20. The inflator 22 is what is referred to as a disk type inflator in the present exemplary embodiment.

Figure 1:
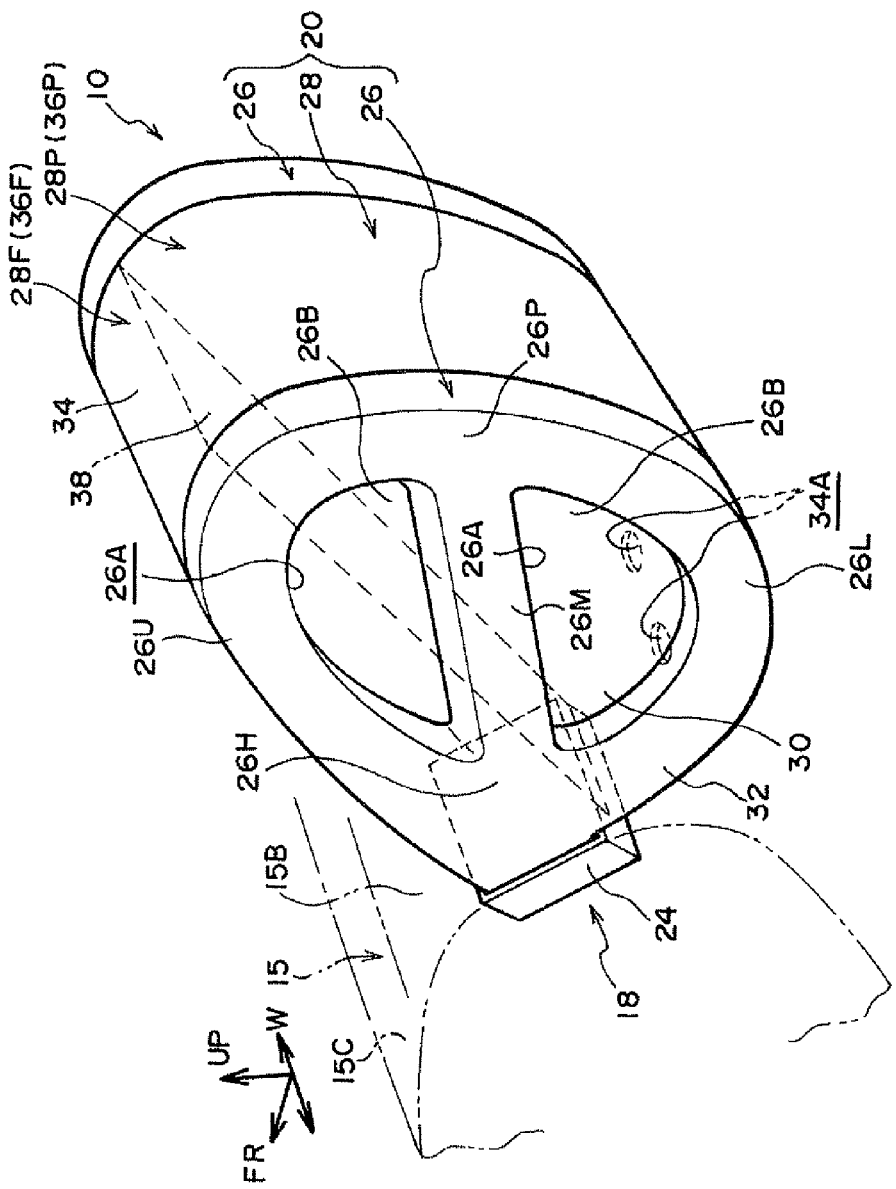
FIG. 1 is a perspective view schematically illustrating a deployed state of an airbag in an occupant seat airbag device according to a first exemplary embodiment of the present invention, as viewed from the occupant side.
Figure 2:
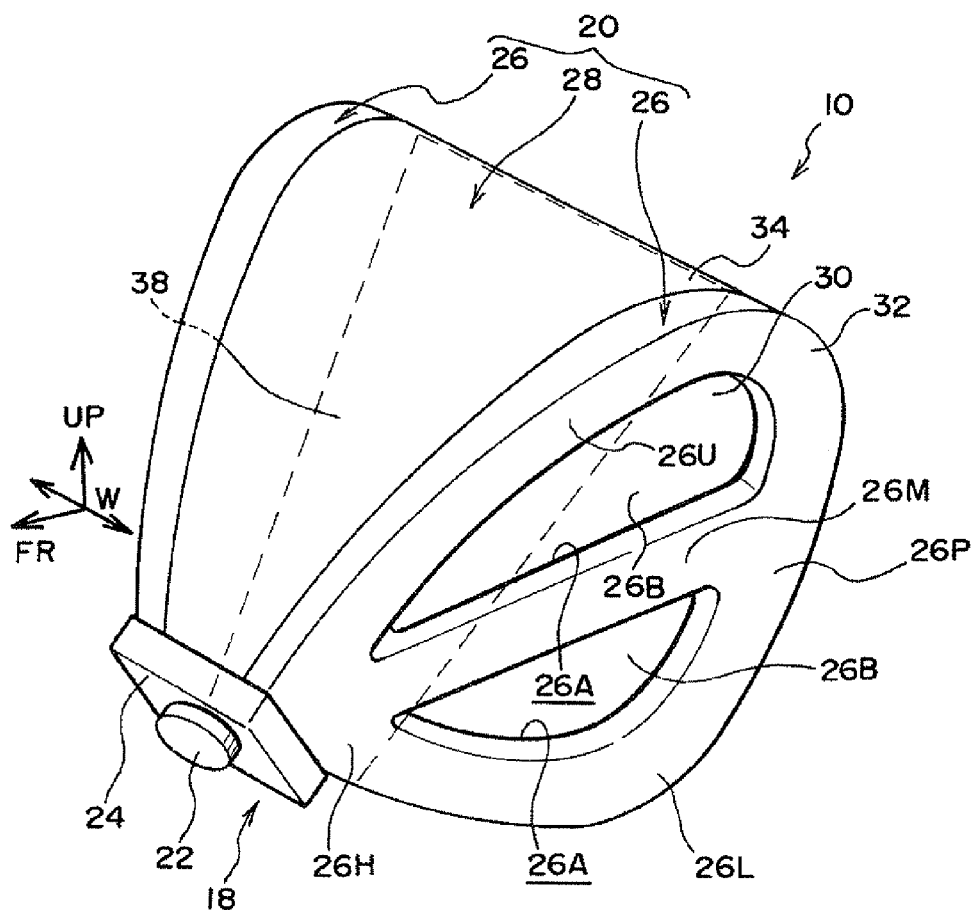
FIG. 2 is a perspective view schematically illustrating a deployed state of an airbag in an occupant seat airbag device according to the first exemplary embodiment of the present invention, as viewed from the side opposite to the occupant side.

As shown in FIG. 1 and FIG. 2, the airbag 20 is configured with main portions of a pair of outer deployment sections 26 provided at the two sides in the bag width direction that is along the vehicle width direction, and an inner deployment section 28 that deploys between the pair of outer deployment sections 26. Each of the outer deployment sections 26 has an outer edge profile in side view that substantially matches the outer edge profile of the airbag 20 in side view, and has a flattened shape that is thin-walled in the bag width direction. The pair of outer deployment sections 26 is formed so as to be substantially symmetrical about a width direction central portion of the airbag 20.

Each of the outer deployment sections 26 has a shape in the present exemplary embodiment that surrounds an upper and lower pair of cutout portions 26A. More specifically, the outer deployment sections 26 are each configured with main portions of: a header portion 26H into which the inflator 22 supplies gas; an upper tube 26U serving as a first tube extending from the header portion 26H diagonally upwards towards the rear; a lower tube 26L serving as a second tube extending from the header portion 26H diagonally downwards towards the rear; a middle tube 26M serving as a third tube extending from the header portion 26H diagonally upwards towards the rear, between the upper tube 26U and the lower tube 26L; and an occupant side tube 26P that connects together the rear ends of the upper tube 26U, the lower tube 26L and the middle tube 26M. Each of the occupant side tubes 26P extends along the vehicle top-bottom direction.

The outer deployment sections 26 are configured to inflate and deploy so as to surround the cutout portions 26A by gas being supplied (filled) into the header portion 26H, the upper tube 26U, the lower tube 26L, the middle tube 26M and the occupant side tube 26P. Each of the outer deployment sections 26 is configured so as to make contact in this inflated and deployed state respectively with the instrument panel 15 and the windshield glass 14, as shown in FIG. 3. A portion of the load (reaction force) when restraining the occupant P is accordingly supported by friction with the instrument panel 15 and the windshield glass 14 through the contact pressure of the outer deployment sections 26.

In the present exemplary embodiment, the middle tube 26M is disposed (extends) along the movement direction of the head H of an occupant P correctly wearing the webbing 16A of the seatbelt device 16 when there is a front-on collision. More specifically, when the vehicle V is involved in a front-on collision, while the lap region of the occupant P is restricted from moving forward by the lap webbing 16E, the upper body U of the occupant P restrained by the seatbelt device 16 moves forward as the shoulder webbing 16D is pulled out from the retractor. Namely, in a forward impact the upper body U displaces so as to tilt forward as shown by arrow A in FIG. 3. The head H displaces diagonally forwards and downwards accompanying this movement. The middle tubes 26M are disposed in side view along this displacement direction of the head H (so as to coincide with the displacement path of the head H). When considering the build of the occupant P, the middle tube 26M is, for example, disposed along the displacement direction of the head H of a comparatively small occupant P.

Figure 4:
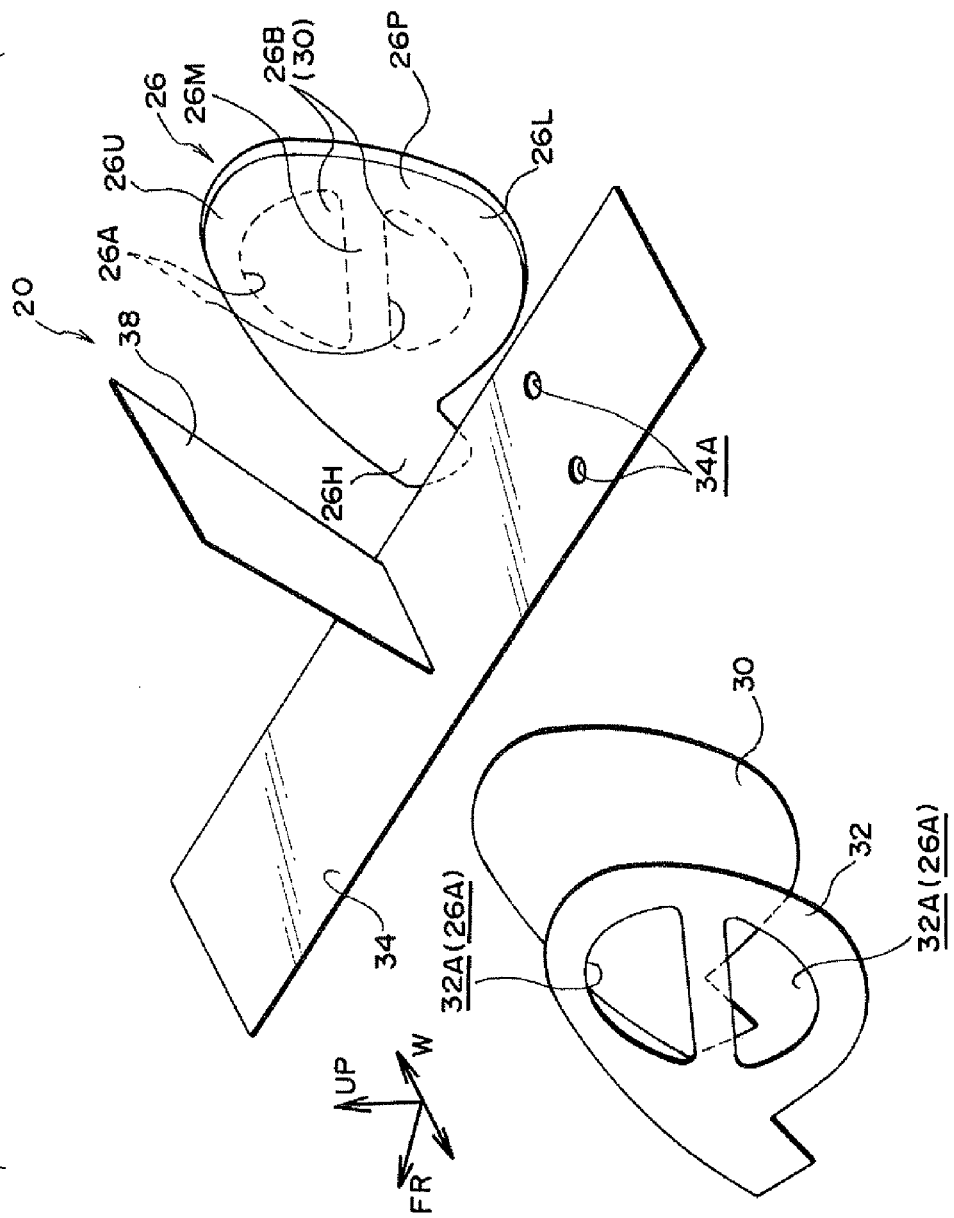
FIG. 4 is an exploded perspective view illustrating an airbag configuring an occupant seat airbag device according to the first exemplary embodiment of the present invention.

In the outer deployment sections 26 explained above, the cutout portions 26A are closed off by closed portions 26B. A more specific explanation is that the outer deployment sections 26 are formed, as shown in FIG. 4, in bag shapes by sewing together an inner cloth 30 and an outer cloth 32. The inner cloth 30 and the outer cloth 32 are shaped with outer edges that substantially match the outer edge of the outer deployment sections 26 in side view. The outer cloth 32 also has cutout portions 32A corresponding to the cutout sections 26A. The outer deployment sections 26 are formed with the cutout sections 26A closed off by the closed portions 26B as described above by sewing the outer edge of the outer cloth 32 to the outer edge of the inner cloth 30, and by sewing the inner edges of the outer cloth 32 to the inner cloth 30. Note that configuration may be made without providing the cutout portions 32A corresponding to the cutout sections 26A to the outer cloth 32, and with cutout portions provided instead to the inner cloth 30.

The inner deployment section 28 is, as shown in FIG. 1, FIG. 2 and FIG. 4, configured with a cloth 34 joining together the pair of outer deployment sections 26. In the present exemplary embodiment the cloth 34 is joined to substantially the entire periphery of the outer edges the pair of outer deployment sections 26, so as to form a closed space (chamber) 36 between the pair of outer deployment sections 26, as shown in FIG. 3.

As shown in FIG. 3, in the airbag 20 the closed space 36 includes a partitioning cloth 38 that partitions between a front side chamber 36F and an occupant side chamber 36P that is a rear side chamber. The partitioning cloth 38 extends diagonally upwards and to the rear from the vicinity of the bottom edge of the airbag case 24, to the vicinity of the top end of the airbag 20. Substantially the entire peripheral edge of the partitioning cloth 38 is sewn onto the inner cloth 30 and the cloth 34. The partitioning cloth 38 accordingly partitions between the front side chamber 36F and the occupant side chamber 36P in a sealed (airtight) state.

In the airbag 20, configuration is made such that gas from the inflator 22 is supplied into the front side chamber 36F, and gas from the inflator 22 is not supplied into the occupant side chamber 36P. Namely, an flow inlet 28A is formed at (the cloth 34 of the portion configuring) the front bottom end portion of the inner deployment section 28, for gas from the inflator 22 to flow into, as shown in FIG. 3. Although omitted in the drawings, the flow inlet 28A is in communication with the header portion 26H and the pair of outer deployment sections 26, respectively.

The airbag 20 is accordingly configured such that a front deployment section 28F is inflated and deployed by gas from the inflator 22 in the pair of outer deployment sections 26 and the inner deployment section 28 to form the front side chamber 36F. The front deployment section 28F is configured, similarly to the outer deployment sections 26 described above, so as to make contact respectively with the instrument panel 15 (the airbag case 24) and the windshield glass 14 in the inflated and deployed state. A portion of the load (reaction force) when restraining the occupant P is accordingly supported by friction with the instrument panel 15 and the windshield glass 14 arising from contact pressure of the front deployment section 28F. The partitioning cloth 38 is also disposed at an inclination, as described above, and the front deployment section 28F is configured to deploy in a shape in which the top end side of the front deployment section 28F is thicker in the vehicle front-rear direction than the bottom end side.

However, an occupant side deployment section 28P forming the occupant side chamber 36P in the inner deployment section 28, is configured so as to deploy while air in the vehicle compartment C is being sucked into the occupant side chamber 36P accompanying inflation and deployment of the pair of outer deployment sections 26 and the front deployment section 28F. Air suction holes 34A are accordingly formed in the cloth 34 configuring the occupant side deployment section 28P. In the present exemplary embodiment, the air suction holes 34A are formed in bottom portions of the airbag 20 that are portions not closed off by the instrument panel 15 during the deployment process.

As shown in FIG. 3, airbag doors 40 are also formed in the portion of the instrument panel 15 to which the airbag module 18 is attached. The airbag doors 40 rupture and open with inflation and deployment of the airbag 20. The airbag doors 40 according to the present exemplary embodiment open up and down about hinge portions by tearing along groove shaped tear lines formed on the inside face of the instrument panel 15, so as to form an opening in the instrument panel 15. Configuration thus permits the airbag 20 to inflate and deploy out of the instrument panel 15, namely into the vehicle compartment C.

The occupant seat airbag device 10 explained above is configured such that an airbag ECU serving as a controller, not shown in the drawings, actuates the inflator 22 when, based for example on output from a collision sensor, not shown in the drawings, a front-on collision of the vehicle V is detected or when it is predicted to be impossible to avoid a front-on collision.

Explanation follows regarding operation of the present exemplary embodiment.

In the occupant seat airbag device 10 configured as described above, the airbag ECU actuates (ignites) the inflator 22 when a front-on collision of the vehicle V is detected or predicted based on output from the collision sensor. Then, on receipt of gas supplied from the inflator 22, the airbag 20 inflates inside the instrument panel 15, and causes the airbag doors 40 to open due to this deployment pressure, such that the airbag 20 inflates and deploys into the vehicle compartment C through the thus formed opening.

When this occurs, the gas from the inflator 22, supplied through the flow inlet 28A and the header portion 26H, inflates and deploys the front deployment section 28F and the pair of outer deployment sections 26. The occupant side deployment section 28P deploys as air is sucked in through the air suction holes 34A accompanying such inflation and deployment.

Then the upper body U of the occupant P who is being restrained by the seatbelt device 16 tilts forwards, as illustrated by arrow A in FIG. 3, makes contact with the airbag 20, and forward movement is restricted by the airbag 20. However an occupant P who has not fitted the seatbelt device 16 moves forwards in a substantially straight line, as illustrated by arrow B in FIG. 3, makes contact with the airbag 20, and such forward movement is restricted.

Namely, when the occupant contacts (the cloth 34 configuring) the back face of the inner deployment section 28, tension in the cloth 34 in the airbag 20 suppresses the pair of outer deployment sections 26 from separating from each other in the bag width direction as the occupant side deployment section 28P is collapsed by the occupant P. An effect is accordingly exhibited that absorbs the energy of the occupant P. When the occupant P is restrained in this manner, the pair of outer deployment sections 26 and the inner deployment section 28 of airbag 20 each makes contact with the windshield glass 14 and the instrument panel 15. The airbag 20 accordingly obtains a reaction force during restraining the occupant through friction with the windshield glass 14 and the instrument panel 15.

In the occupant seat airbag device 10, required frictional force is obtained by concentrating (the flow of) gas on the upper tube 26U, the lower tube 26L and the front deployment section 28F, which are the main portions in the airbag 20 that make contact with the windshield glass 14 and the instrument panel 15.

For example, in a top mounted airbag device installed in the top face 15C of the instrument panel 15, as shown by the dotted lines in FIG. 3, the contact surface area between an airbag 100 and the windshield glass 14 and the instrument panel 15 can be made large. Therefore the required supporting reaction force is readily obtained. However, in the airbag device according such a comparative example, due to being a structure that obtains the reaction force employed by relying on the contact surface area between the airbag 100 and the windshield glass 14, the volume of the airbag 100, and therefore the volume of the inflator, unfortunately increases.

However in comparison thereto, the occupant seat airbag device 10 is configured to concentrate gas on the pair of outer deployment sections 26 and the front deployment section 28F and to secure the reaction force by friction, as described above. The gas volume of the airbag 20 is accordingly comparatively smaller than in the above comparative example. Namely, in the airbag 20 the deployed shape of the airbag itself is smaller than that of the airbag 100 according to the above comparative example. However, in the airbag 20, due to configuration such that only a portion of the airbag 20 is inflated and deployed by gas from the inflator 22, the gas volume is also smaller, smaller by the amount corresponding to the occupant side deployment section 28P, than that of a configuration in which the whole of the airbag is inflated and deployed by gas pressure.

In the occupant seat airbag device 10, the airbag 20 can thus be made with a smaller volume while still securing occupant restraining capability.

In the occupant seat airbag device 10, the cutout sections 26A are formed in the pair of outer deployment sections 26, respectively, and so the airbag 20 is made even smaller in volume. Namely, the airbag 20 concentrates gas pressure in the header portion 26H and the occupant side tube 26P that both connect together the upper tube 26U contacting the windshield glass 14 and the lower tube 26L contacting the instrument panel 15. The airbag 20 can thereby secure contact pressure against the windshield glass 14 and the instrument panel 15, namely friction (reaction force), while still being a structure including the cutout sections 26A. The shape (orientation) of the outer deployment sections 26 is also readily maintained while restraining the occupant P due to the presence of each of the middle tubes 26M that connects together the header portion 26H and the occupant side tube 26P between the upper tube 26U and the lower tube 26L.

However, the middle tube 26M in the airbag 20 is disposed so as to substantially align with the movement path of the head H of the occupant P restrained by the webbing 16A of the seatbelt device 16 during a front-on collision. The head H of the occupant P can accordingly be restrained appropriately (with an appropriate load) between the middle tubes 26M during a front-on collision of the vehicle V by the inner deployment section 28 deployed without gas pressure between the pair of outer deployment sections 26.

Moreover, the occupant seat airbag device 10 is a configuration in which not only the pair of outer deployment sections 26 but also the front deployment section 28F is inflated and deployed by gas pressure, thereby securing the capability to restrain an occupant P who has not fitted the webbing 16A of the seatbelt device 16. Namely, since an occupant P who has not fitted the webbing 16A of the seatbelt device 16 moves as a whole (with substantially all their weight) in a straight line forwards, a large reaction force is required for such restraint. In the occupant seat airbag device 10, friction with the windshield glass 14 and the instrument panel 15 is obtained by the gas pressure of the front deployment section 28F, and so a large accompanying reaction force can be obtained to restrain the occupant P.

However, the partitioning cloth 38 deploys diagonally as described above, and the top portion of the front deployment section 28F is positioned further toward the vehicle front-rear direction rear than the rear edge of the bottom portion thereof. The front deployment section 28F thereby inflates and deploys such that the upper portion is thicker along the vehicle front-rear direction than the bottom portion thereof. The head H of the occupant P moving directly forwards along the arrow B direction can accordingly be restrained appropriately by the top portion of the front deployment section 28F that has been inflated and deployed by gas pressure.

In the airbag 20, the closed space 36 is formed by stitching the cloth 34 to the outer edge of the pair of outer deployment sections 26 over substantially their whole periphery. The airbag 20 is accordingly deployed in an overall bag shape (shape formed with the closed space 36) due to gas supplied to the pair of outer deployment sections 26 and the front deployment section 28F. Namely, as viewed from the side, each portion of the periphery of the pair of outer deployment sections 26 is connected by the cloth 34. In the airbag 20, the pair of outer deployment sections 26 are accordingly suppressed from separating from each other in the width direction as the occupant P is being restrained, contributing to appropriate restraint of the occupant. The airbag 20 also does not catch on a portion of the occupant P during the process of restraining the occupant P.

Figure 5:
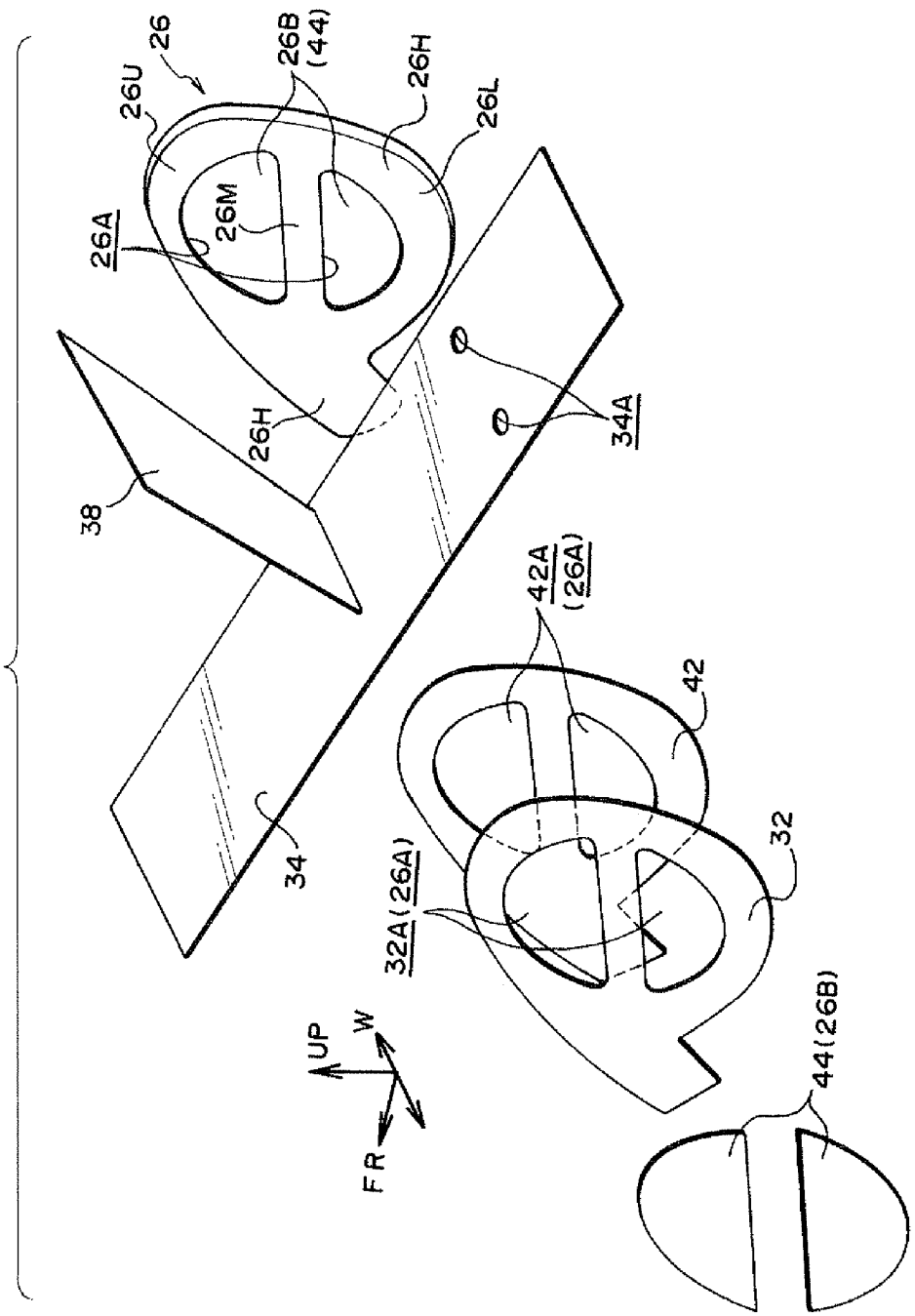
FIG. 5 is an exploded perspective view illustrating a modified example of an airbag configuring an occupant seat airbag device according to the first exemplary embodiment of the present invention.

An example has been given in the first exemplary embodiment in which each of the outer deployment sections 26 are configured by sewing the inner cloth 30 and the outer cloth 32 together, however there is no limitation thereto. For example, configuration may be made as in the modified example illustrated in FIG. 5. Outer deployment sections 26 according to the modified example are configured with an inner cloth 42, formed with cutout portions 42A similar to the cutout portions 32A, and an outer cloth 32 stitched together at the inside and outside edges thereof. According to the modified example two cutout sections 26A are thereby also formed in the outer deployment sections 26, each surrounded by a header portion 26H, an upper tube 26U, a lower tube 26L and an occupant side tube 26P. In this modified example, the cutout sections 26A are each closed off by respective closed portions 26B formed by a cloth 44 that is a separate piece of cloth to the inner cloth 42 and the outer cloth 32. Portions of a partitioning cloth 38 are sewn to the closed portions 26B where the partitioning cloth 38 passes through the cutout sections 26A.

Explanation follows regarding another exemplary embodiment of the present invention. Note that fundamentally similar components and portions to those configuring the first exemplary embodiment, the modified example, and previous configurations are allocated the same reference numerals to those of the first exemplary embodiment, the modified example and the previous configurations, and further explanation thereof is omitted.

Second Exemplary Embodiment

Figure 6:
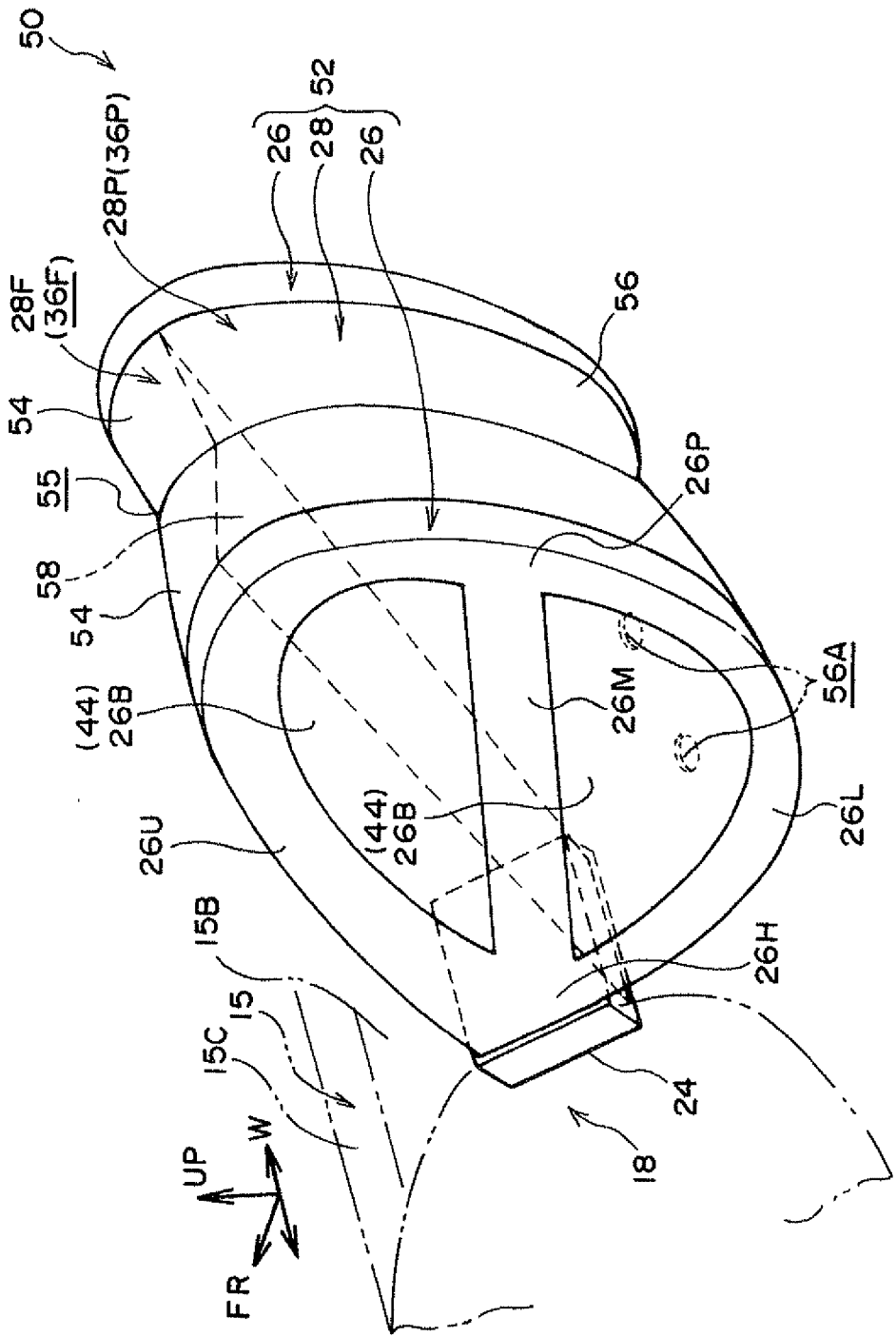
FIG. 6 is a perspective view schematically illustrating a deployed state of an airbag in an occupant seat airbag device according to a second exemplary embodiment of the present invention, as viewed from the occupant side.
Figure 7:
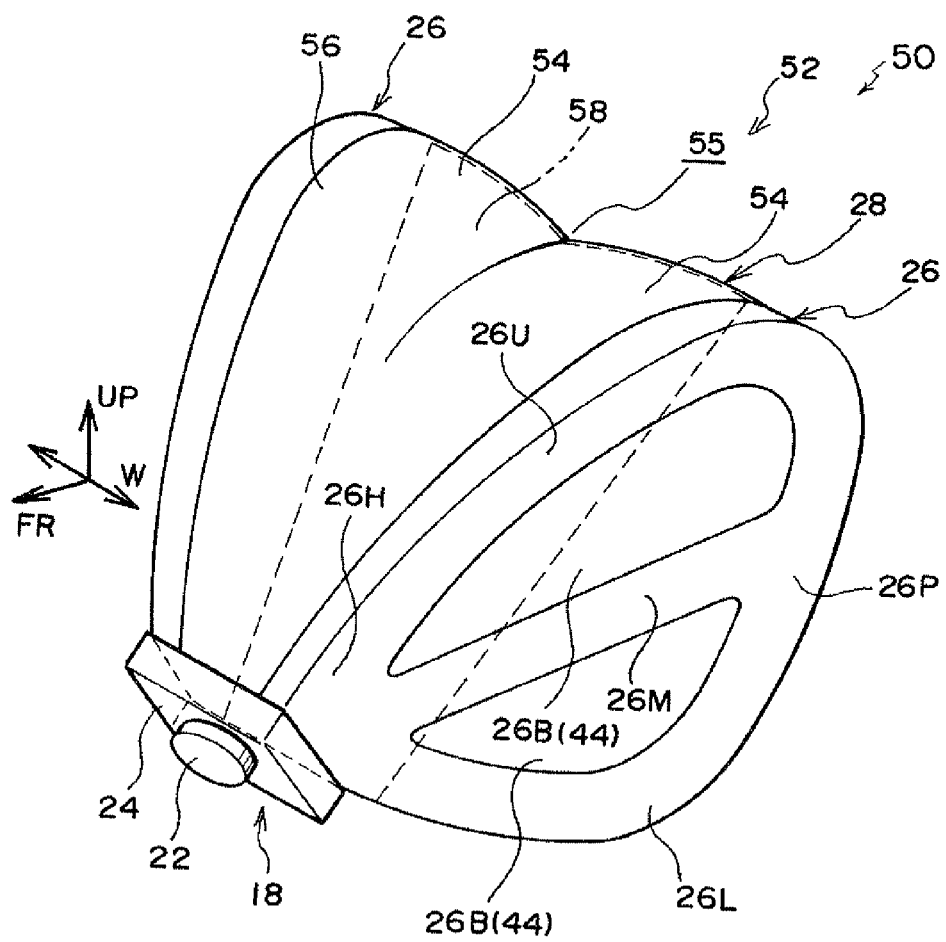
FIG. 7 is a perspective view schematically illustrating a deployed state of an airbag in an occupant seat airbag device according to the second exemplary embodiment of the present invention, as viewed from the side opposite to the occupant side.

FIG. 6 is a perspective view corresponding to FIG. 1 illustrating an airbag 52 configuring an occupant seat airbag device 50 serving as an airbag device according to the second exemplary embodiment of the present invention. FIG. 7 is a perspective view illustrating the airbag 52 corresponding to FIG. 2. As shown in these drawings, the occupant seat airbag device 50 differs from the occupant seat airbag device 10 according to the first exemplary embodiment in that the airbag 52 deploys in a shape that has an indented bag width direction central portion at least on the rear face facing towards the occupant P.

Figure 8:
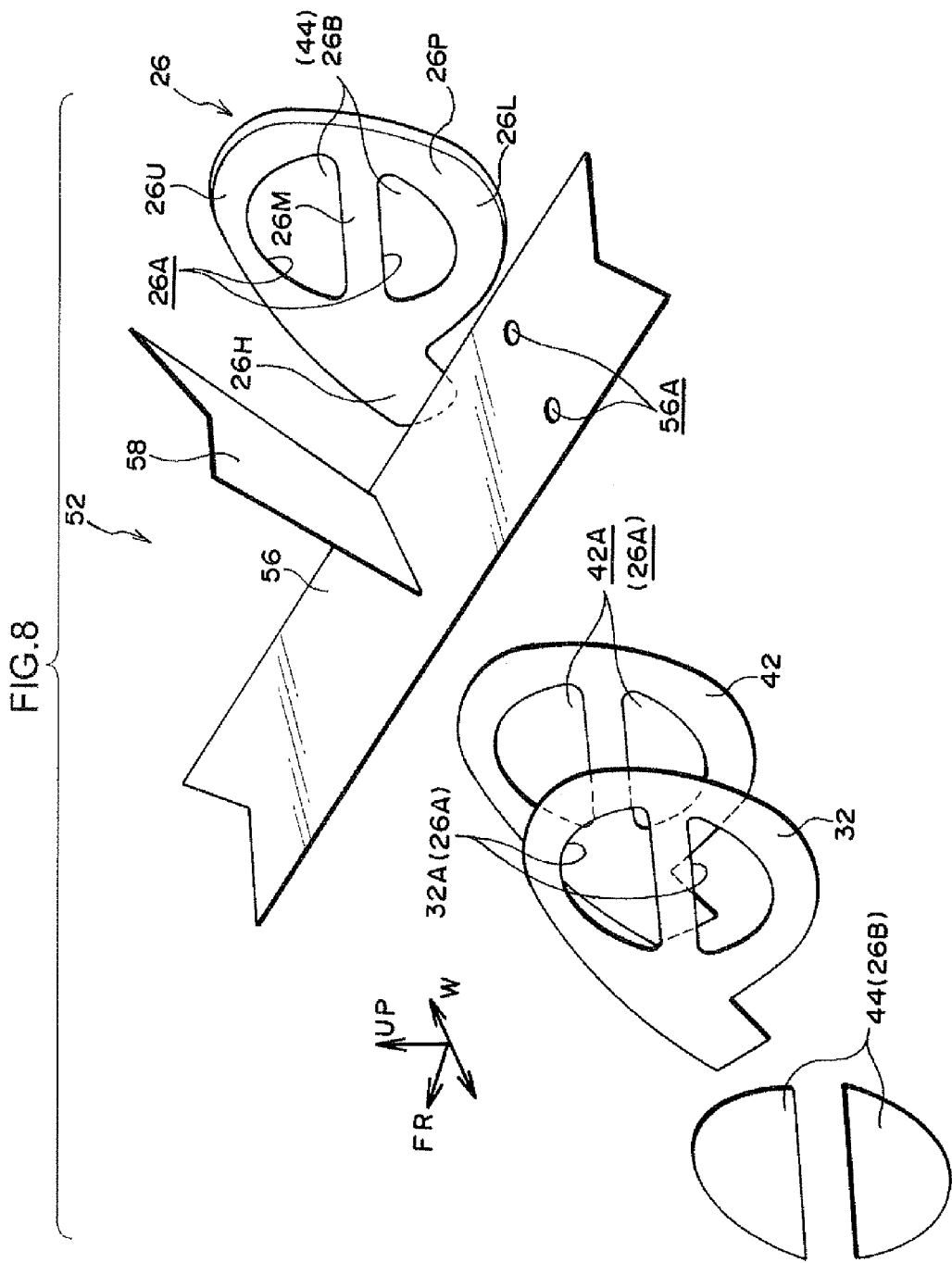
FIG. 8 is an exploded perspective view illustrating an airbag configuring an occupant seat airbag device according to the second exemplary embodiment of the present invention.

Namely, in the airbag 52, while the head H of the occupant P enters an indented portion 55 indented between a pair of projecting portions 54 at an inner deployment section 28, the two shoulder regions of the occupant P make contact with the pair of projecting portions 54, restricting the occupant P from moving towards the vehicle front. Due to obtaining this deployed shape, a cloth 56 configuring the inner deployment section 28 (a closed space 36) in the airbag 52 is, as shown in FIG. 8, set with a shorter circumferential length at a width direction center side than at the two width direction sides thereof. The cloth 56 is formed with air suction holes 56A corresponding to the air suction holes 34A.

A partitioning cloth 58 is provided in place of the partitioning cloth 38. The top end side of the partitioning cloth 58 is formed in a substantially V-shape, contributing to the top end portion of the airbag 52 deploying such that the inner deployment section 28 is formed with the pair of projecting portions 54 (the indented portion 55). Other parts of the configuration of the occupant seat airbag device 50 (the airbag 52), including non-illustrated portions, are configured similarly to the corresponding portions of the occupant seat airbag device 10 (the airbag 20).

Accordingly, similar advantageous effects can be obtained by the occupant seat airbag device 50 of the second exemplary embodiment by fundamentally the same operation as that of the occupant seat airbag device 10 according to the first exemplary embodiment.

In the occupant seat airbag device 50, the indented portion 55 is formed at the width direction central portion of the portion of the inner deployment section 28 of the airbag 52 facing towards the occupant P side. The occupant P can thereby be restrained appropriately without the airbag 52 becoming misaligned in the width direction with respect to the occupant P. Namely, in the airbag 52, the two shoulders of the occupant P (the high strength regions of a person's body) can be firmly restrained while still suppressing load from acting on the head H of the occupant P entering the indented portion 55.

Third Exemplary Embodiment

Figure 9:
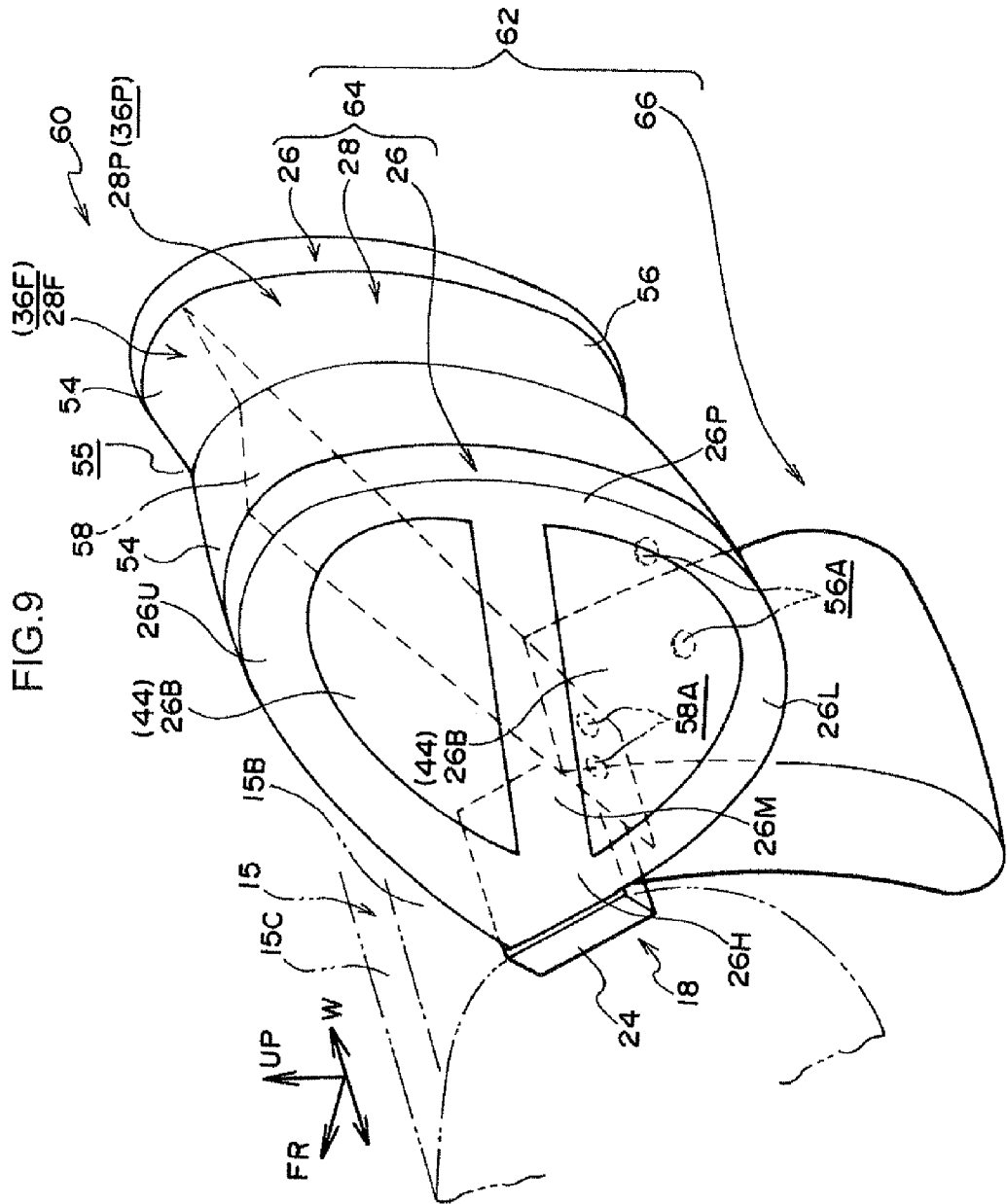
FIG. 9 is a perspective view schematically illustrating a deployed state of an airbag in an occupant seat airbag device according to a third exemplary embodiment of the present invention, as viewed from the occupant side.
Figure 10:
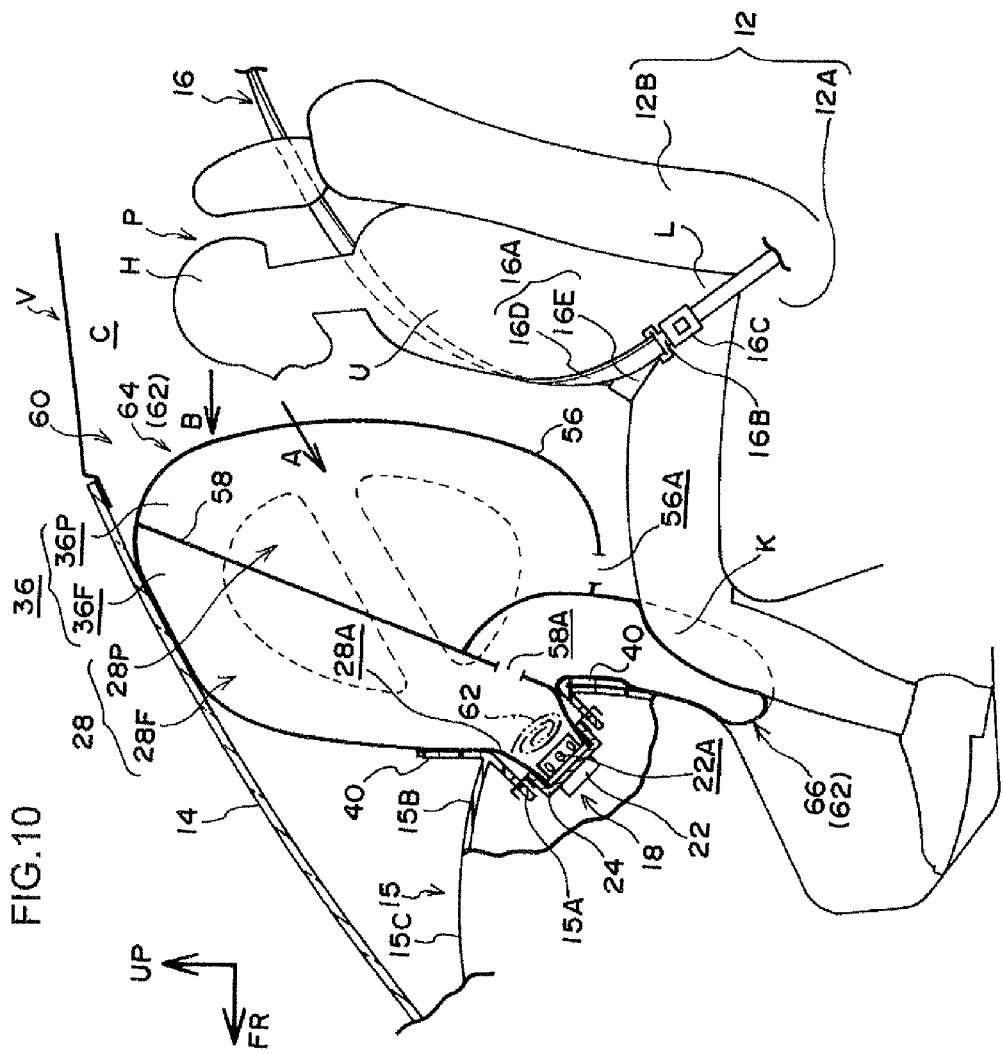
FIG. 10 is a cross-section view from the side schematically illustrating a deployed state of an airbag configuring an occupant seat airbag device according to a third exemplary embodiment of the present invention.

FIG. 9 is a perspective view corresponding to FIG. 1 illustrating an airbag 62 configuring an occupant seat airbag device 60 serving as an airbag device according to a third exemplary embodiment of the present invention. FIG. 10 is a schematic cross-section view corresponding to FIG. 3 and illustrating a front section inside a vehicle compartment C of a vehicle V with the occupant seat airbag device 60 in an actuated state. As shown in these drawings, the occupant seat airbag device 60 differs from the occupant seat airbag device 50 according to the second exemplary embodiment in that in addition to an upper body airbag 64 corresponding to the airbag 52, the airbag 62 is also provided with a knee airbag 66 serving as a lower side deployment section for protecting the knees K of the occupant P.

The upper body airbag 64 is configured similarly to the airbag 52 (the airbag 20). The upper portion of the knee airbag 66 passes through a cloth 56 and intrudes into an occupant side deployment section 28P, with the top side open end of the knee airbag 66 closed off by a partitioning cloth 58. Gas supply holes 58A are formed in the partitioning cloth 58 for supplying gas from the inflator 22 through the front deployment section 28F into the knee airbag 66. Other parts of the configuration of the occupant seat airbag device 60 (the airbag 62), including not-illustrated portions, are similar to corresponding portions of the occupant seat airbag device 50 (the airbag 52).

Consequently similar advantageous effects can also be obtained by the occupant seat airbag device 60 according to the third exemplary embodiment, by fundamentally the same operation to that of the occupant seat airbag device 50 according to the second exemplary embodiment (and the occupant seat airbag device 10 according to the first exemplary embodiment).

In the occupant seat airbag device 60, the knees K of the occupant P are also restrained by the inflated and deployed knee airbag 66 that has received gas supplied through the gas supply holes 58A of the partitioning cloth 58 when the vehicle V is involved in a front-on collision. The knees K of the occupant P are accordingly protected from impacting the instrument panel 15. The airbag 62, with the knee airbag 66 integrally formed thus to the upper body airbag 64, can thereby be obtained with a simple structure.

The upper body airbag 64, configured similarly to the airbag 20 that has a reduced volume as described above, also has a small volume. Gas is accordingly supplied to the knee airbag 66 a shorter time after starting actuation of the inflator 22 than in a comparative example in which the whole of the upper body airbag is inflated and deployed by gas supply. The occupant seat airbag device 60 is accordingly capable of protecting the knees K by the knee airbag 66 inflating and deploying appropriately in a narrow gap between the knees K of the occupant and the instrument panel 15.

Fourth Exemplary Embodiment

Figure 11:
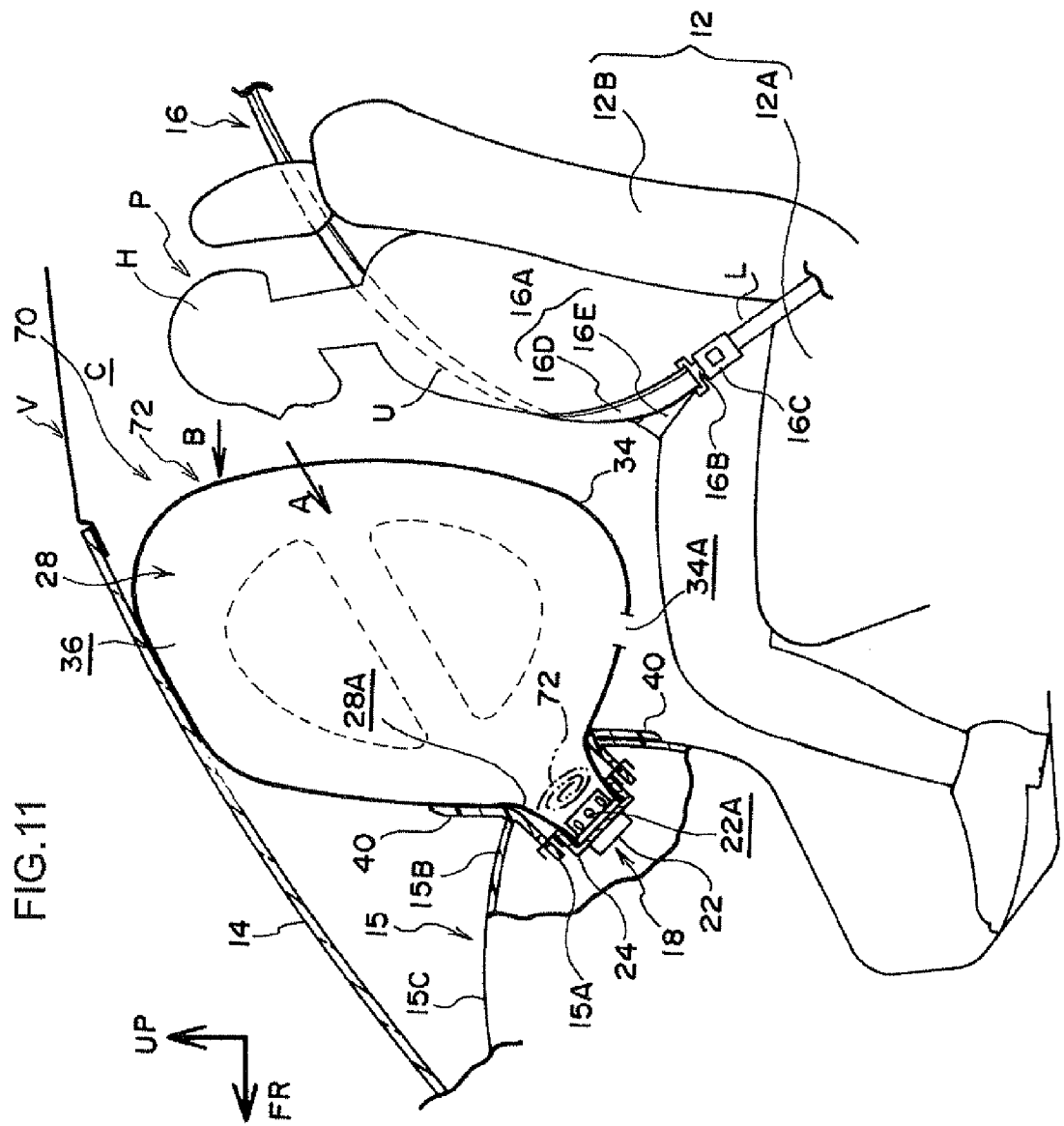
FIG. 11 is a cross-section view from the side schematically illustrating a deployed state of an airbag configuring an occupant seat airbag device according to a fourth exemplary embodiment of the present invention.

FIG. 11 is a schematic cross-section view corresponding to FIG. 3 of a front section inside a vehicle compartment C of a vehicle V, illustrating an actuated state of an occupant seat airbag device 70 serving as an airbag device according to a fourth exemplary embodiment of the present invention. As shown in this drawing, the occupant seat airbag device 70 differs from the occupant seat airbag device 10 according to the first exemplary embodiment in that an airbag 72 is configured without the partitioning cloth 38.

Namely, the airbag 72 configuring the occupant seat airbag device 70 is configured with main portions of a pair of outer deployment sections 26, and an inner deployment section 28 provided between the pair of outer deployment sections 26 and formed with a single (connected) interior closed space 36. In the airbag 72, merely supplying the pair of outer deployment sections 26 (the tube portions excluding cutout sections 26A) with gas from the inflator 22 results in the whole of the airbag 72 being deployed, as air inside the vehicle compartment is introduced into the closed space 36 through the air suction holes 34A. Other parts of the configuration, including not-illustrated portions, of the occupant seat airbag device 70 (the airbag 72) are configured similarly to corresponding portions of the occupant seat airbag device 10 (the airbag 20).

Consequently, the occupant seat airbag device 70 according to the fourth exemplary embodiment can also obtain similar advantageous effects by fundamentally the same operation to that of the occupant seat airbag device 10 according to the first exemplary embodiment, excluding operation and effects arising from configuring to inflate and deploy the front deployment section 28F by gas supply.

In each of the above exemplary embodiments, examples have been illustrated in which the pair of outer deployment sections 26 each have two of the cutout sections 26A, however the present invention is not limited thereto. For example, the configuration may be made with each of the outer deployment sections 26 not provided with the cutout sections 26A, or with each of the outer deployment sections 26 provided with 1 or 3 or more of the cutout sections 26A. Configuration may also be made, for example, where the number, shape and/or placement of the cutout sections 26A differ between the outer deployment section 26 on one side and the outer deployment section 26 on the other side.

In each of the above exemplary embodiments, examples have been given in which the closed space 36 is formed by sewing the cloth 34, 54 around substantially the whole of the periphery of the outer edges of the pair of outer deployment sections 26, however the present invention is not limited thereto. It is sufficient to configure such that the inner deployment section 28 functions to restrain the occupant P (make contact with the occupant P) between the pair of outer deployment sections 26, and functions by tension to suppress the pair of outer deployment sections 26 from separating from each other in the width direction (to control the restraining posture). Accordingly, for example, the inner deployment section 28 may be configured from separate independent cloths, such as a cloth that makes contact with the occupant P and a pair of upper and lower cloths connecting between the top edges and between the bottom edges of the pair of outer deployment sections 26.

Furthermore, in each of the above exemplary embodiments examples have been illustrated in which the airbag device according to the present invention is applied to the occupant seat airbag devices 10, 50, 60, 70, however the present invention is not limited thereto. Accordingly, for example, the airbag device according to the present invention may be applied to a vehicle width direction central seat of seats enabling 3 occupants to sit across in the seat width direction. Such a central seat may be taken as falling within the definition of the occupant seat of the present invention.

The invention claimed is:

1. An airbag device comprising:
   a gas generation device that is disposed inside a portion of an instrument panel facing a vehicle top-bottom direction top side and a vehicle front-rear direction rear side;
   a pair of outer deployment sections that receive gas supplied from the gas generation device and inflate and deploy separately from each other in a vehicle width direction;
   an inner deployment section that connects the pair of outer deployment sections at least at the vehicle front-rear direction rear side, the vehicle top-bottom direction top side and a vehicle top-bottom direction bottom side, the inner deployment section deploying as the pair of outer deployment sections are deployed;
   a partitioning cloth that partitions the closed space into a first space at a vehicle front-rear direction front side and a second space at the vehicle front-rear direction rear side, the partitioning cloth being configured such that gas from the gas generation device is supplied to the first space and gas from the gas generation device is not supplied to the second space; and
   a lower side deployment section that passes through the inner deployment section and is connected to the partitioning cloth, the lower side deployment section receiving supplied gas so as to inflate and deploy between knees of an occupant and the instrument panel; wherein
   the inner deployment section is configured by connecting peripheral edges of the pair of outer deployment sections with a single cloth so as to deploy to form a closed space between the pair of outer deployment sections, and
   the partitioning cloth is formed with a gas supply hole through which gas from the gas generation device is caused to flow through the first space into the lower side deployment section.

2. The airbag device of claim 1, wherein the partitioning cloth is deployed in an inclined shape such that a vehicle top-bottom direction top portion of the first space is positioned further toward the vehicle front-rear direction rear side than a vehicle top-bottom direction bottom portion of the first space.

3. The airbag device of claim 1, wherein the pair of outer deployment sections comprises:
   a first tube that is inflated and deployed so as to be disposed lengthwise along a top edge of each of the outer deployment sections;
   a second tube that is inflated and deployed so as to be disposed lengthwise along a bottom edge of each of the outer deployment sections;
   a third tube that is separated from the first tube and the second tube, and is inflated and deployed between the first tube and the second tube;
   a header portion that is inflated and deployed so as to be in communication with vehicle front-rear direction front end portions of the first, second and third tubes and to guide the gas from the gas generation device to the first, second and third tubes;
   an occupant side tube that extends along a vehicle top-bottom direction, and is inflated and deployed so as to be in communication with vehicle front-rear direction rear end portions of the first, second and third tubes; and
   a cover section that closes off a portion surrounded by the first tube, the third tube, the header portion and the occupant side tube and that closes off a portion surrounded by the third tube, the second tube, the header portion and the occupant side tube.

4. The airbag device of claim 3, wherein, as seen from a side, the third tube is inflated and deployed so as to be lengthwise along a movement direction of a head of an occupant restrained in a vehicle seat by a seatbelt device during rapid vehicle deceleration.

5. The airbag device of claim 1, wherein the inner deployment section deploys such that a width direction central portion of the inner deployment section has an indented shape with respect to outer deployment section sides of the inner deployment section at least at the vehicle front-rear direction rear side.

* * * * *